US006715196B2

(12) United States Patent
Reising et al.

(10) Patent No.: US 6,715,196 B2
(45) Date of Patent: Apr. 6, 2004

(54) METHOD OF POWDER COATING WELDABLE SUBSTRATES

(75) Inventors: John Reising, Avon, OH (US); Richard S. Tansey, Avon Lake, OH (US); Gregory J. McCollum, Gibsonia, PA (US); Ronald J. Isger, Medina, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 62 days.

(21) Appl. No.: 10/025,406

(22) Filed: Dec. 19, 2001

(65) Prior Publication Data

US 2003/0124379 A1 Jul. 3, 2003

(51) Int. Cl.$^7$ .................................................. B23P 25/00

(52) U.S. Cl. ......................... 29/458; 29/527.2; 427/405; 427/189; 427/202; 427/388.1; 427/379

(58) Field of Search ........................ 29/458, 460, 527.1, 29/527.2; 427/470, 475, 477, 486, 189, 195, 202, 384, 385.5, 388.1, 378, 377, 404, 405, 379; 228/49.1

(56) References Cited

U.S. PATENT DOCUMENTS

| | | | | | |
|---|---|---|---|---|---|
| 3,708,321 | A | | 1/1973 | Spieles | 117/17 |
| 3,843,571 | A | | 10/1974 | Fitzgerald | 260/17 R |
| 3,932,347 | A | | 1/1976 | Camelon et al. | 260/42.14 |
| 3,932,348 | A | | 1/1976 | Camelon et al. | 260/42.14 |
| 3,932,349 | A | | 1/1976 | Camelon et al. | 260/42.14 |
| 3,939,114 | A | | 2/1976 | Camelon et al. | 260/42.14 |
| 3,941,584 | A | | 3/1976 | Tundermann et al. | 75/0.5 R |
| 3,941,731 | A | | 3/1976 | Camelon et al. | 260/17 R |
| 4,254,235 | A | * | 3/1981 | Turpin | 427/195 |
| 4,590,235 | A | | 5/1986 | Troy | 524/439 |
| 4,731,290 | A | | 3/1988 | Chang | 428/335 |
| 4,849,283 | A | | 7/1989 | Porter, Jr. et al. | 428/323 |
| 5,407,707 | A | | 4/1995 | Simeone et al. | 427/410 |
| 5,824,144 | A | | 10/1998 | He et al. | 106/403 |
| 6,022,911 | A | | 2/2000 | Hashizume et al. | 523/213 |
| 6,156,379 | A | * | 12/2000 | Terada et al. | 427/214 |
| 6,245,839 | B1 | * | 6/2001 | Jolley et al. | 427/195 |
| 6,291,027 | B1 | * | 9/2001 | Emch | 427/542 |

FOREIGN PATENT DOCUMENTS

| | | |
|---|---|---|
| EP | 0 401 766 | 12/1990 |
| GB | 1404556 | 9/1975 |
| WO | WO 99/18161 | 4/1999 |
| WO | WO 02/070613 | 9/2002 |

* cited by examiner

*Primary Examiner*—Peter Vo
*Assistant Examiner*—Jermie E. Cozart
(74) *Attorney, Agent, or Firm*—William J. Uhl

(57) ABSTRACT

A method of coating metallic substrates with weldable primer and at least one powder coating is provided by the present invention. The base powder coating contains flake pigments that align parallel to the surface when the powder coating is heated. Optionally, a clear top coating is applied over the base powder coating. Substrates coated by the method of coating are also provided. The method of coating allows substrates coated with weldable primer to be assembled into assemblies or finished parts by welding, and then to be coated with the powder basecoat and clear coat. The parts prepared have striking visual effects and performance comparable to conventional automotive parts but are prepared more efficiently and economically.

29 Claims, No Drawings

METHOD OF POWDER COATING WELDABLE SUBSTRATES

FIELD OF THE INVENTION

This invention relates to an improved method of producing visually attractive weldable parts, in particular automotive parts, with attractive metallic-like appearance, without the need of expensive electrodeposition baths, using weldable prepainted metal substrate to which are applied essentially zero VOC powder coatings. The powder coatings comprise flake pigments, which give the metallic-like appearance. The invention also relates to parts prepared by this method.

BACKGROUND OF THE INVENTION

Light gauge continuous sheet metal is produced by rolling mill lines in various thickness and widths. In the case of steel sheet metal, it may be coated at the mill with a thin layer of zinc or zinc alloy in order to provide steel sheet with improved corrosion resistance. After production of the sheet, mill oil is applied in the case of steel sheet and the sheet metal is wound into a coil for shipment to a customer for further processing. Such sheets are used by customers for a number of industrial and automotive applications. At the customer, the metal sheet is unwound and cleaned to remove any mill oil and dirt and to reduce the amount of metal oxide on the surface of the metal, after which the metal is coated with one or more layers of coating. The coatings usually include at least one primer to provide improved corrosion protection as well as adhesion of subsequent coating layers to the substrate. One common and very effective method of applying primer to metal substrates is the electrodeposition method in which a primer with an ionic, often cationic, species on the polymer backbone, is attracted to and deposits itself on a metal part which has the opposite charge, after which the coated parts are baked to cure the primer. Following the application of the primer, other layers of coating such as primer-surfacer can be applied for improved adhesion and smoothness. The final layers of coating to be applied are what is generally seen by the end user of the part, and these coatings, in addition to providing protection, such as hardness, weathering protection, and the like to the part, provide a visually attractive finish.

In the production of parts for automobile and other vehicle bodies, sheet metal from the mill, usually galvanized steel, is generally formed into the desired shape. The forming oil is then cleaned from the sheet. Following the cleaning step, the metal is pretreated with a phosphate pretreatment. The phosphated metal parts are then assembled into an automobile body with various forms of attachment such as clenching, gluing, and particularly spot welding.

The vehicle body is then primed with a cationic electrodeposition primer. The application of the electrodeposition primer (ED primer) at the automotive manufacturer requires large immersion baths. Such baths require large capital investment and continuous monitoring during production and occupy large areas of plant space. Moreover, the ED primer often does not form a film of sufficient thickness to be effective in confined or partially enclosed areas. Such areas may be seen where one piece of metal is bent over and clenched to another piece of metal to connect the two pieces of metal. In such a configuration, the ED primer often fails to deposit adequately in the region of the bend, leaving an area of metal relatively unprotected against corrosion. Another area in which an adequate layer of ED primer may not form is the interior of enclosed parts such as doors.

The process of applying a weldable anticorrosive primer to the metal sheet after cleaning and prior to forming of the metal sheet into an automotive part ensures the presence of an adequate thickness of anticorrosive primer in enclosed or confined areas of vehicle assemblies. Furthermore, application of the primer to the continuous sheet of metal can be done by roll coating in which the primer is applied by a roll moving in the same direction, or more commonly the opposite direction, as the moving sheet of metal. After the weldable primer is applied and dried and/or cured, the continuous sheet of primed metal can be wound into a coil. Roll coat application of primer to a continuous strip of metal has the advantage that it is nearly 100% efficient, that is, virtually all of the liquid primer is applied to the metal strip and cured, and the volatiles emitted during the baking process are commonly collected and burned as fuel for the oven, leading to low atmospheric emissions. The roll coat application and cure of the weldable primer can be done at a location separate from the vehicle manufacturing plant. Typically it is done at a company specializing in coil coating application, but it may even be done at the steel mill itself. Removal of the priming step from the vehicle manufacturing plant can eliminate the need for the large expensive ED immersion tanks and can lead to more efficient use of space and resources in the vehicle plant.

Although use of such coating processes are well known to those practicing the coil-coating art, conventional coil coating primers generally can not be used because the steel sheet, after being cut and formed into parts in a stamping press, is usually assembled into assemblies and vehicle bodies by spot welding. Conventional coil coating primers do not allow sufficient electric current to pass during the spot welding process to cause a weld to form in the metal. If conventional coil coatings are applied at very low dry film thickness enough current may pass to form a weld, but at such low thickness corrosion protection is inadequate. The weldable primer of the current invention avoids such limitations by inclusion of electrically conductive pigments as well as anticorrosive pigments to give a weldable formable primer with good corrosion protection. Because the primer is electrically conductive, additional corrosion protection can be realized, if needed, by coating the parts formed from the prepainted metal with ED primer after they are assembled.

SUMMARY OF THE INVENTION

In the current invention, after assembly of the parts formed from the metal sheet coated with weldable primer, the parts may optionally be given an additional phosphate pretreatment. The parts are then coated with a colored powder basecoat and optionally a powder clearcoat. Powder basecoats and clearcoats are desirable because they provide: superior appearance and chip resistance vs. liquid primers; essentially zero VOC vs. liquid primers; and 98 to 99% utilization in most facilities vs. 70 to 80% maximum for liquids.

The colored powder basecoat comprises metallic or non-metallic flake pigments. The pigments themselves may be colored, or uncolored. The parts are baked for a period of time sufficient to melt and coalesce the powder coating and to allow the flakes to align with the surface. The use of the flake pigments, especially colored flake pigments, in colored basecoats allows a wide range of striking visual effects.

The powder basecoat may be used without further coatings, but improved hardness, weathering and UV resistance, and visual appeal will be realized with application of a powder clearcoat. These powder clearcoats provide similar VOC and utilization advantages as those gained with powder basecoats with appearance and durability comparable to liquid clear coats. U.S. Pat. No. 5,407,707 describes the preparation of powder clear coats with excellent physical and chemical properties prepared from epoxy functional copolymers and polycarboxylic acid curing agents.

The advantages of the invention are the ability to produce panels and parts, particularly for automotive applications, with striking visual effects, good hardness, and weather and UV resistance by a method that does not require the use of large expensive electrodeposition baths. Although the conductive coating is positioned beneath the powder basecoat, primer surfacers are not needed, and preferably are not used. A further advantage of the invention is the ability to produce these panels and parts using a virtually zero VOC topcoat system with the same high utilization rates as those all ready demonstrated by the automotive powder primer and powder clear products currently in commercial use.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "cure" as used in connection with a composition, e.g., "composition when cured," and "thermoset" as used in connection with a composition, e.g. "thermoset composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

As used herein, the terms "typically", e.g., "The temperature of the treating solution at application is typically about 10° C. to about 85° C."; "generally", e.g., "The width of the continuous metal sheet generally ranges from about 30.5 to about 183 centimeters"; and "commonly", e.g., "more commonly, the substrates coated by this method will be metallic" as used in the detailed description of the invention is intended to describe methods frequently used, but is not intended to limit the application of the invention.

The present invention relates to a method of coating a substrate with a conductive, weldable primer, optionally pretreating and applying other primers, such as electrodeposition primers to the weldable primer, and applying a visually attractive powder color coat and optionally a clear coat. The present invention also relates to the substrate prepared by this method.

The substrates of this invention may be non-metallic or metallic. More commonly, the substrates coated by this method will be metallic. The metal substrates used in the practice of this invention include ferrous metals, non-ferrous metals, and combinations thereof. Suitable ferrous metals include iron, steel, and alloys thereof. Non-limiting examples of useful steel materials include cold rolled steel, zinc coated steels such as hot dip galvanized and electrogalvanized steel, stainless steel, pickled steel, zinc-iron alloy such as GALVANEAL, zinc-aluminum alloys coated over steel such as GALVALUME, AND GALFAN, and combinations thereof. It is possible for different portions of the same substrate to be different forms of ferrous metal, for example, for the zinc coating to be applied to only certain portions or one side of the steel substrate. Useful non-ferrous metals include aluminum, zinc, magnesium, and alloys thereof. Combinations or composites of ferrous and non-ferrous metals can also be used. Preferred metallic substrates are anti-corrosive steels such as the zinc coated steels and the zinc-iron alloy and the zinc-aluminum alloys mentioned above. Although substrates of any desired shape can be used, the substrate is preferably in the form of a sheet, and more preferably in the form of a continuous sheet wound about a spool in the form of a coil. The thickness of the continuous sheet preferably ranges from about 0.254 to about 3.18 millimeters (mm) (about 10 to about 125 mils), and more preferably about 0.3 mm although the thickness can be greater or less, as desired. The width of the continuous metal sheet generally ranges from about 30.5 to about 183 centimeters (about 12 to 72 inches), although the width can vary depending on metal manufacturer and intended use.

Before depositing the coatings of the present invention upon the surface of the metal substrate, it is preferred to remove dirt, oil, or foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. Non-limiting examples of suitable alkaline cleaning agents include CHEMKLEEN 163 and CHEMKLEEN 177 phosphate cleaners that are commercially available from PPG Industries, Inc. of Pittsburgh, Pa.

Following the cleaning step, the metal substrate is usually rinsed with water, preferably deionized water, in order to remove any residue. The metal substrate can optionally be dried using an air knife, by flashing the water off by brief exposure to a high temperature, or by passing the metal between squeegee rolls.

Following the cleaning and optional drying steps, the metal substrate may be optionally pretreated with a thin layer of pretreatment. The advantages of pretreatment include protection of the metallic substrate from corrosion and improvement of adhesion of subsequent coating layers to the substrate. Pretreatments may be chrome containing or preferably chrome-free. The choice of pretreatment is generally determined by the substrate and environmental considerations. Appropriate pretreatments are well known to those skilled in the art. An example of a suitable chrome pretreatment is Granodine 1415A available from Henkel Surface Technologies, NA. An example of a chrome-free pretreatment is Nupal 456BZ available from PPG Industries, Inc. Some weldable compositions, in particular those with phosphatized epoxy resinous binder systems, perform well in the absence of pretreatment.

The pretreatment solution is applied to the surface of the metal substrate by any conventional application technique, such as spraying, immersion or roll coating in a batch or continuous process. The temperature of the treating solution at application is typically about 10° C. to about 85° C., and preferably about 15° C. to about 40° C. The pH of the preferred treating solution at application generally ranges from about 2.0 to about 9.0, and is preferably about 3 to about 5.

The film coverage of the residue of the pretreatment coating generally ranges from about 0.1 to about 1000 milligrams per square meter ($mg/m^2$), and is preferably about 1 to about 400 $mg/m^2$.

Hereafter, the term "substrate" shall refer to the cleaned, optionally pretreated, substrate.

Following the optional pretreatment step, the conductive, weldable coating is applied to the cleaned substrate.

The conductive, weldable coating is formed from a weldable composition comprising one or more electroconductive pigments which provide electroconductivity to the weldable coating and one or more binders which adhere the electroconductive pigment to the substrate. Non-limiting examples of suitable electroconductive pigments include zinc, iron phosphide, aluminum, iron, graphite, nickel, tungsten and mixtures thereof. The zinc, iron phosphide, and mixtures thereof are preferred. Preferred zinc particles are commercially available from Stolberger ZINCOLI as ZINCOLI S 620 or from US Zinc as Superfine 7 zinc dust. The iron phosphide is available as Ferrophos Microfine grade 2132 from Glenn Springs Holdings of Lexington, Ky. The average particle size (equivalent spherical diameter) of the electroconductive pigment particles generally is less than about 10 micrometers, preferably ranges from about 1 to about 5 micrometers, and more preferably about 3 micrometers.

Since the metal substrates are to be subsequently welded, the weldable coating must comprise a substantial amount of electroconductive pigment, generally greater than about 10 volume percent and preferably about 30 to about 60 volume percent on a basis of total volume of electroconductive pigment and binder.

The binder is present to secure the electroconductive pigment and other pigments in the composition to the substrate. Preferably, the binder forms a generally continuous film when applied to the surface of the substrate. Generally, the amount of binder can range from about 5 to about 50 weight percent of the coating composition on a total solids basis, preferably about 10 to about 30 weight percent and more preferably about 10 to about 20 weight percent.

The binder can comprise oligomeric binders, polymeric binders and mixtures thereof. The binder is preferably a resinous polymeric binder material selected from thermosetting binders, thermoplastic binders or mixtures thereof. Non-limiting examples of suitable thermosetting materials include polyesters, epoxy-containing materials, phenolics, polyurethanes, and mixtures thereof, in combination with crosslinkers such as aminoplasts or isocyanates which are discussed below. Non-limiting examples of suitable thermoplastic binders include high molecular weight epoxy resins, defunctionalized epoxy resins, vinyl polymers, polyesters, polyolefins, polyamides, polyurethanes, acrylic polymers and mixtures thereof.

Preferred binder materials are polyglycidyl ethers of polyhydric phenols, such as those discussed above, having a weight average molecular weight of at least about 2000 and preferably ranging from about 5000 to about 100,000. These materials can be epoxy functional or defunctionalized by reacting the epoxy groups with phenolic materials. Such binders can have epoxy equivalent weights of about 2000 to about one million. Non-limiting examples of useful epoxy resins are commercially available from Shell Chemical Company as EPON® epoxy resins. Preferred EPON® epoxy resins include EPON® 1009, which has an epoxy equivalent weight of about 2300–3800. Useful epoxy defunctionalized resins include EPONOL resin 55-BK-30 which is commercially available from Shell. Other preferred binders are the reaction product of epoxy resins as described above with a compound containing phosphorous acid groups.

Suitable crosslinkers or curing agents are described in U.S. Pat. No. 4,346,143 at column 5, lines 45–62 and include blocked or unblocked di- or polyisocyanates such as DESMODUR® BL 1265 toluene diisocyanate blocked with caprolactam, which is commercially available from Bayer, and aminoplasts such as etherified derivatives of urea-melamine- and benzoguanamine-formaldehyde condensates which are commercially available from Cytec Industries under the trademark CYMEL® and from Solutia under the trademark RESIMENE®.

Preferably, the coating composition comprises one or more diluents for adjusting the viscosity of the composition so that it can be applied to the metal substrate by conventional coating techniques. The diluent should be selected so as not to detrimentally affect the adhesion of the weldable coating to the pretreatment coating upon the metal substrate. Suitable diluents include ketones such as cyclohexanone (preferred), acetone, methyl ethyl ketone, methyl isobutyl ketone and isophorone; esters and ethers such as 2-ethoxyethyl acetate, propylene glycol monomethyl ethers such as DOWANOL PM, dipropylene glycol monomethyl ethers such as DOWANOL DPM or propylene glycol methyl ether acetates such as PM ACETATE which is commercially available from Dow Chemical; and aromatic solvents such as toluene, xylene, aromatic solvent blends derived from petroleum such as SOLVESSO® 100. The amount of diluent can vary depending upon the method of coating, the binder components and the pigment-to-binder ratio, but generally ranges from about 10 to about 50 weight percent on a basis of total weight of the weldable coating.

The coating can further comprise optional ingredients such as phosphorus-containing materials, including metal phosphates or the organophosphates; inorganic lubricants such as GLEITMO 1000S molybdenum disulfide particles which are commercially available from Fuchs of Germany; coloring pigments such as iron oxides; flow control agents; thixotropic agents such as silica, montmorillonite clay and hydrogenated castor oil; anti-settling agents such as aluminum stearate and polyethylene powder; dehydrating agents which inhibit gas formation such as silica, lime or sodium aluminum silicate; and wetting agents including salts of sulfated castor oil derivatives such as RILANIT R4.

Other pigments such as carbon black, magnesium silicate (talc), zinc oxide and corrosion inhibiting pigments including calcium modified silica, zinc phosphate and molybdates such as calcium molybdate, zinc molybdate, barium molybdate and strontium molybdate and mixtures thereof can be included in the coating composition. Generally, these optional ingredients comprise less than 20 weight percent of the coating composition on a total solids basis, and usually about 5 to about 15 weight percent. Preferably, the weldable coating is essentially free of chromium-containing materials, i.e., comprises less than about 2 weight percent of chromium-containing materials and more preferably is free of chromium-containing materials.

The preferred coating compositions contain EPON® 1009 epoxy-functional resin or the reaction product of Epon® 1004 with phosphoric or superphosphoric acid, zinc dust, salt of a sulfated castor oil derivative, silica, molybdenum disulfide, red iron oxide, the blocked isocyanate formed by the reaction of polymeric MDI with the reaction product of bisphenol A and polyethylene oxide, melamine resin, dipropylene glycol methyl ether, propylene glycol methyl ether acetate and cyclohexanone.

The coating compositions can be applied to the surface of the substrate by any conventional method well known to those skilled in the art, such as dip coating, direct roll coating, reverse roll coating, curtain coating, air and airless spraying, electrostatic spraying, pressure spraying, brushing such as rotary brush coating or a combination of any of the techniques discussed above.

After application, the conductive, weldable coating compositions are preferably dried and/or cured to set the coating composition and form a substantially continuous coating upon the substrate. The coating can be formed at ambient temperature or preferably at an elevated temperature ranging up to about 300° C. peak metal temperature. Many of the binders such as those prepared from epoxy-containing materials require curing at an elevated temperature for a period of time sufficient to vaporize any diluents in the coating and to set the binder. In general, baking temperatures will be dependent upon film thickness and the components of the binder. For preferred binders prepared from epoxy-containing materials, peak metal temperatures of about 150° C. to about 300° C. are preferred. For preferred binders prepared from phosphated epoxy-containing materials, peak metal temperatures of about 140° C. to about 190° C. are preferred. The period of baking in conventional conveyor ovens is typically from 20 seconds to 60 seconds, preferably from 24 seconds to 30 seconds. The period of baking is usually determined by the time required to reach desired peak metal temperature in a given oven. It will be recognized by those skilled in the art that alternate means of heating the substrate such as infrared or induction heating will require much shorter times to reach peak metal temperature, often less than 10 seconds. After the baking the coated substrate is typically cooled with water, followed by drying with an air knife.

The thickness of the dried, conductive, weldable coating can vary depending upon the use to which the coated substrate will be subjected. Generally, to achieve sufficient corrosion resistance for coil metal for automotive use, the applied coating should have a dry film thickness of at least about 1 micrometer (about 0.04 mils), preferably about 1 to about 20 micrometers and more preferably about 3 to about 8 micrometers. For other substrates and other applications thinner or thicker coatings can be used. Lower dry film thickness is associated with better welding whereas higher dry film thickness is associated with better corrosion protection. Preferred dry film thickness for zinc pigmented coatings in this invention is between 3 micrometers and 5 micrometers, preferred dry film thickness for the iron phosphide-pigmented weldable coatings in this invention is between 5 micrometers and 8 micrometers.

After the conductive weldable coating has been dried and/or cured, the metal substrate may be optionally lubricated, and the metal may be wound into a coil for storage or for transport to another location for further operations.

The steps described above may be conducted at a mill, or more commonly, the metal is wound into a coil at the mill and shipped to a separate location, such as a coil coater, for the coating operation where the above-described steps are carried out. After coating the sheet is rewound into a coil and shipped to another location, such as an automotive assembly plant where the metal is unwound, cleaned, optionally lubricated, cut into appropriate sized sheets, formed into discrete shapes, spot welded into a unit assembly, such as an automobile body, the unit assembly is then optionally cleaned and pretreated, typically with a phosphate type pretreatment and optionally primed with electrodeposited primer.

The unit assembly is then coated with a decorative color coating composition and optionally further coated with a clear coat. The color coating composition is in the form of a solid particulate material commonly called a powder coating. The composition of the powder coating comprises a polymeric film-forming binder and a flake coloring pigment such as aluminum flake and/or metal oxide coated micas.

Preferably, the polymeric, film-forming binder of the base powder coating is of the thermoset type wherein the binder comprises: (a) one or more polymers having reactive functional groups and; (b) one or more curing agents selected to react with the functional groups of (a).

Polymers Containing Functional Groups

The powder base coat compositions of the present invention comprise polymers containing functional groups such as hydroxyl, carboxylic acid, epoxy, carbamate, amide and carboxylate functional groups.

The use in powder coatings of acrylic, polyester, polyether and polyurethane oligomers and polymers having hydroxyl functionality is well known in the art. Monomers for the synthesis of such oligomers and polymers are chosen such that the resulting oligomers and polymers have a $T_g$ greater than 40° C. Examples of such oligomers and polymers having hydroxyl functional groups suitable for use in the powder coating compositions of the present invention are those described in U.S. Pat. No. 5,646,228 at column 5, line 1 to column 8, line 7, incorporated by reference herein.

The use in powder coatings of acrylic polymers having carboxylic acid functionality is well known in the art. Monomers for the synthesis of the acrylic polymers having carboxylic acid functionality suitable for use in the powder coating compositions of the present invention are chosen such that the resulting acrylic polymer has a $T_g$ greater than 40° C. Examples of carboxylic acid group containing acrylic polymers are those described in U.S. Pat. No. 5,214,101 at col. 2, line 59 to col. 3, line 23, hereby incorporated by reference.

The use in powder coatings of polyester polymers having carboxylic acid functionality is well known in the art. Monomers for the synthesis of the polyester polymers having carboxylic acid functionality suitable for use in the powder coating compositions of the present invention are chosen such that the resulting polyester polymer has a $T_g$ greater than 40° C. Examples of carboxylic acid group containing polyester polymers are those described in U.S. Pat. No. 4,801,680 at col. 5, lines 38 to 65, hereby incorporated by reference.

Besides carboxylic acid group-containing acrylic polymers, the powder coating compositions of the present invention can, and typically do, contain a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750 and mixtures thereof. This material is crystalline and is preferably a low molecular weight crystalline carboxylic acid group-containing polyester.

Also useful in powder coating compositions are acrylic, polyester and polyurethane polymers containing carbamate functional groups and epoxy functional groups, such as those well known in the art. Examples of such polymers having carbamate functionality suitable for use in the powder coating compositions of the invention are described in international application WO 94/10213. Examples of polymers having epoxy functionality suitable for use in powder coating compositions are described in U.S. Pat. No. 5,407,707. Monomers for the synthesis of such polymers for use in the powder coating compositions are chosen such that the resulting polymer has a high $T_g$, that is, a $T_g$ greater than 40° C.

For the powder color coat, the preferred polymer containing functional groups is a carboxylic acid group-containing polymer, preferably a polyester polymer. For the powder clear coat, the preferred polymer is an epoxy functional polymer, preferably an epoxy group-containing acrylic polymer.

Curing Agents

Blocked isocyanates as curing agents for (OH) and primary and/or secondary amino group containing materials are well known in the art. Examples of blocked isocyanates suitable for use as curing agents in the powder coating compositions of the present invention are those described in U.S. Pat. No. 4,988,793, col. 3, lines 1 to 36, hereby incorporated by reference.

Polyepoxides as curing agents for (COOH) functional group containing materials are well known in the art. Examples of polyepoxides suitable for use as curing agents in the powder coating compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the powder coating compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for (NCO) functional group containing materials and anhydrides, and are well known in the art. Polyols for use in the powder coating compositions of the present invention are selected such that the resultant material has a high glass transition temperature, i.e., greater than 50° C.

Beta-hydroxyalkylamide materials as crosslinkers for carboxylic acid-functional polymers (a) are disclosed in U.S. Pat. No. 4,801,680. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

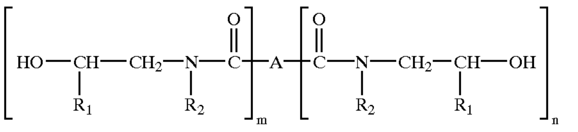

wherein $R_1$ is H or $C_1$–$C_5$ alkyl; $R_2$ is H, $C_1$–$C_5$ alkyl or:

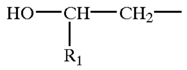

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical $-(CH_2)_x-$ where x is from 2 to 12, preferably from 4 to 10.

The beta-hydroxyalkylamide can be prepared by reacting a lower alkyl ester or mixture of esters of carboxylic acids with a beta-hydroxyalkylamine at a temperature ranging from ambient temperature up to about 200° C. depending on the choice of reactants and the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

Anhydrides as curing agents for epoxy functional group containing materials are well known in the art. Examples of such curing agents include trimellitic anhydride, benzophenone tetracarboxylic dianhydride, pyromellitic dianhydride, tetrahydrophthalic anhydride, and the like as described in U.S. Pat. No. 5,472,649 at col. 4, lines 49 to 52.

Aminoplasts as curing agents for OH, COOH and carbamate functional group containing materials are well known in the art. Examples of such curing agents suitable for use in the present invention are aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The preferred curing agents for the powder color coat are hydroxyalkylamides that are used with the preferred carboxylic acid functional polymers. Such a binder system is described in U.S. Pat. No. 4,801,680.

The preferred curing agent for the powder clear coat is a polycarboxylic acid that is used with the preferred epoxy-functional polymer. Such a binder system is described in U.S. Pat. No. 5,407,707.

Examples of flake pigments include aluminum flake pigments such as PCA9155 manufactured by Eckart. Other metal flake compositions may be used such as bronze flake, stainless steel flake, and the like; silver flake, and other precious metal flakes. Preferred flake pigments range from 1.0 to 50.0 micron in size. In addition to the flake pigments described, other metallized polymeric particles may be used. Examples include aluminized Mylar and aluminized polyester fibers.

Preferred flake pigments useful in this invention comprise metal oxide coated mica particles. The metal oxides used as coatings on the mica particles can comprise titanium dioxide, ferric oxide, chromium hydroxide, and the like and combinations thereof. Suitable mica flake pigments are available commercially as Afflair pigments from EM Chemicals and the Mearl Corporation's pearlescent pigments.

The flake pigment is incorporated into the powder coating at a level of 0.1% to 20.0% based on the total weight of the powder coating. More preferred amounts of the flake pigment is between 1.0% and 10.0% based on total weight of the coating composition.

In order for the attractive visual effects caused by the orientation of the flake pigment in the resultant coating to be realized, the flake pigment particles are incorporated into the powder coating by either dry blending rather than extrusion. The dry blending operation can be conducted with cooling or with heating. Dry blending with heat is referred to as "bonding". The bonding method is believed to attach the flake pigment to the binder particles, but not to actually disperse the flake pigment in the binder powder particles. The "bonding" method of dispersion is particularly useful in the dispersion of metal flake particles since it eliminates the undesirable electrostatic effects that occur in the electrostatic spraying of metallic particles.

In addition to the colored flake pigments, one or more additional non-flake pigments can be included in the coating composition typically in amounts from about 1 to about 50 percent by weight, based on the total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Other additives, such as flow control agents, anti-popping agents, and anti-caking agents, may be added to the powder coating. Suitable as flow control agents are acrylic polymers, such as polylauryl acrylate, polybutyl acrylate, poly(2-ethylhexyl) acrylate, poly(ethyl-2-ethylhexyl) acrylate, polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluorooctanoic acid. Polymeric siloxanes with molecular weights over 1,000 may also be used as a flow control agent, for example, polydimethylsiloxane or poly(methylphenyl)siloxane. The flow control agents can aid in reduction of surface tension during heating of the powder and in eliminating crater formation. Generally, the flow control agent, when used, is present in amounts from about 0.05 to about 5 percent by weight based on the total weight of the powder coating composition.

Anti-popping agents can be added to the compositions to allow any volatile material present to escape from the film during baking. Benzoin is a highly preferred degassing agent and when used is present amounts ranging from about 0.5 to about 3 percent by weight based on total weight of the powder coating composition. The powder coating compositions may also preferably contain UV absorbing agents, such as TINUVIN, which when used are typically present in the compositions in amounts of about 0.5 to about 6 percent by weight based on the total weight of the powder coating composition.

In addition, the powder coating composition may contain fumed silica or the like as a powder flow additive to reduce caking of the powder during storage. An example of fumed silica is sold by Cabot Corporation under the trademark CAB-O-SIL RTM. The powder flow additive, when used, is generally present in amounts ranging from about 0.1 to about 0.5 percent by weight based on the total weight of the powder coating composition. The powder flow additive is generally added to the particulate powder coating composition after preparation of the particulate mixture.

The colored powder coating can be applied by electrostatic spraying or by the use of a fluidized bed. Electrostatic spraying is preferred. The powder coating composition can be applied in one pass or in several passes to provide a film thickness after cure of about 12.7 to about 102 micrometers (0.5 to about 4 mils). Preferred coating thickness is such that good chip resistance, U.V. opacity, and visual hiding is realized. Preferred film thickness is 51 to 102 micrometers (2 to 4 mils). The substrate to be coated can optionally be preheated prior to application of the powder to promote a more uniform powder deposition.

After application of the color powder coating to the substrate, the substrate is heated to a temperature sufficient to melt and coalesce the coating. This is an important step in the present invention because when done correctly the flake pigment migrates to the air interface and aligns itself in a substantially parallel direction to the substrate, resulting in a distinctive, visually pleasing appearance. The heating step should be conducted such that the color powder coating coalesces to a substantially continuous fluid layer, but not so high as to cause viscosity increase and crosslinking of the coating before the flake pigment rises to the coating-air interface and aligns with the coating surface. The layer is maintained in the fluid state for a period of time sufficient for the flake pigment to rise to the coating-air interface and to align so that the two largest dimensions of the pigment flake are almost parallel with the coating surface. After the pigment has aligned itself with the coating surface, the coating may continue to be heated until, in the case of thermoset powder basecoats, partial or complete cure is accomplished. Alternatively, the coating may be cooled prior to cure. In the case where thermoplastic or radiation cured clear topcoat is applied to a thermoset powder color coat, the coated substrate must be heated for a period sufficient to cure the color coat. Typically, the color coat is heated to a temperature between 120° C. and 185° C. for a period of 4 minutes to 40 minutes. Alternatively when a heat curable thermosetting clear coat is used, the color coat does not have to be completely cured and complete cure can occur during the cure cycle of the thermosetting clear coat.

Preferably the color coat is topcoated with a clear coat to enhance the appearance of the color coat and/or to improve the physical properties of the color coats. The clear topcoat may be any known in the art, but preferred topcoats are thermoset types. Particularly preferred topcoats are thermoset powder clear topcoats.

The clear powder topcoat may optionally contain additives for flow and wetting such as waxes, degassing additives such as benzoin, adjuvant resin to modify and optimize coating properties, ultraviolet (UV) light absorbers and curing catalyst. These optional additives, when present, are used in amounts up to 11.0% by weight based on weight of resin solids of the coating composition.

The clear powder topcoat may be applied by electrostatic spray or fluidized bed, but electrostatic spray is preferred. The preferred film thickness is between 38 and 90 micrometers (1.5 and 3.5 mils). The clear powder topcoat is heated to a temperature and for a period of time sufficient to melt and coalesce the powder particles, and in the case of a heat-cured thermoset clear topcoat, to cure the topcoat and any uncured portions of the basecoat and weldable primer. Liquid clearcoats may also be used. The crosslink mechanism of thermoset coatings may be thermal cure or ultraviolet radiation or ionizing radiation cure, although thermal cure is preferred. Also thermoplastic clear coats may be used.

The powder coatings compositions are typically prepared by blending the polymers containing the functional groups, crosslinking agents (for thermosetting compositions) and optional ingredients for 15 minutes in a Henschel blade blender. The powder is then usually extruded such as through a Baker-Perkins twin-screw extruder. The extrudate is particulized typically by first chipping into flake and then milling in a hammer mill. The finished powder can be then classified to a particle size of usually between 20 and 30 micrometers in a cyclone grinder/sifter.

EXAMPLES

The following examples show the preparation of a coated panel by the method of the present invention using a conductive, weldable coating to which is applied a powder color coat and a powder clear coat. For the purpose of comparison, a panel is coated by a conventional method using an electrodeposition primer a liquid color coat and a liquid clear coat. The coated panels were compared for various properties as shown in the Table that follows.

Example A

Preparation of Pretreated Panels

Two-sided hot dipped Galvaneal panels from USX Corporation, 15.3 centimeters (cm) wide and 38.1 centimeters (cm) long, were cleaned in a spray tank with CHEMKLEEN™ 163 cleaner solution (CHEMKLEEN™ 163 concentrate dissolved in tap water at a concentration of 2% on a volume basis) for 2 minutes at 60° C. (135–145° F.). The panels were rinsed with deionized water and dried with a warm air blower. The time duration of the cleaning step was adjusted to cause the rinse water to drain from the vertical surface of the metal panel in a sheet with no breaks in the water, thus indicating an oil-free surface. The panels were wrapped in paper and stored overnight in a dessicator, although the overnight storage is not necessary for the benefits of the present invention. The next day, the panels were pretreated with NUPAL® 456 composition on both sides by direct roll coating and dried by baking for 15 seconds in a 204° C. (400° F.) gas fired conveyor oven to reach a peak metal temperature of approximately 104° C. (220° F.). The panels were wrapped in paper and stored under ambient room conditions until primed.

Example B

Preparation of Panels Coated on Both Sides with Weldable Coil Primer of Current Invention Bonazinc 3001 was applied to pretreated panels of Example A by drawdown with a wire-wound drawdown bar to obtain a 3.5 micron dry film thickness on both the front and back sides. The coating was applied to the backside of the panel first. The panel was baked for 45 seconds to a peak metal temperature of 121° C. (250° F.) in a gas fired conveyor oven. The panel was allowed to air cool and Bonazinc 3001 was applied to the front side of the panel at the same dry film thickness. The panel was baked for 45 seconds to a peak metal temperature of 232° C. (450° F.) in a gas fired conveyor oven and the panel was cooled by quenching in a water bath followed by a deionized water rinse and the panels were then allowed to air dry. The dry panels were wrapped in paper and stored at room temperature and humidity until coated with the basecoat and clearcoat.

Envirocron® Powder basecoat PZB53100 containing colored mica pigment was applied to the coated substrates prepared above by electrostatic spray and was baked 17 minutes at 154° C. (310° F.) in an electric box oven and were allowed to air cool to give a basecoat film with a film thickness of 43 to 56 micrometers (1.7 to 2.2 mils).

The Enviracryl® powder clearcoat PCC10106 was applied to the basecoat by electrostatic spray and was baked in an electric box oven for 27 minutes at 165° C. (330° F.) to give a clearcoat film with a film thickness of 48 to 61 micrometers (1.9 to 2.4 mils).

Example C (Comparative)

Preparation of Control Panels Coated on Both Sides with Conventional System

ED6100H electrodeposition primer was applied by electrodeposition to pretreated panels of Example (A) and the panels were baked for 20 minutes at 177° C. (350° F.) to give a film of 20 to 30 micrometers (0.8 to 1.2 mils). Liquid-Waterborne HWB190430 basecoat containing colored mica pigment was applied to the primed substrate by spray application and was baked for 10 minutes at 121° C. (250° F.) to give a film of 20 to 38 micrometers (0.8 to 1.5 mils). Diamond Coat® DCT5002H solvent borne clear coat composition was then applied to the basecoat by spray application and was baked for 30 minutes at 141° C. (285° F.) to give a film thickness of 38 to 64 micrometers.

Comparison of Panels

The following table shows a direct comparison of panels coated by the method of the present invention (Example B) and panels coated with commercial grade control paint system (Example C) The results show that the panels prepared by the method of the current invention are equal in automotive test properties to those of the commercial control.

| | Coil Primed Panels of Example B | Control Panels of Example C |
|---|---|---|
| Metal Substrate | Hot-Dipped Galvaneal | Hot-Dipped Galvaneal |
| Primer Layer | Coil Applied Bonazinc 3001 | Electrodeposition ED6100H |

-continued

| | Coil Primed Panels of Example B | Control Panels of Example C |
|---|---|---|
| Base-Coat | Envirocron ® Powder PZB53100 | Liquid-Waterborne HWB190430 |
| Clear-Coat | Enviracryl ® Powder PCC10106 | Diamond Coat ® DCT5002H |
| 20° Gloss | 82–95 | 82–95 |
| ASTM D-523-94: Chip Resistance ASTM 3170-91 (GM Scale: 1 = poor 10 = excellent) | 7–8 | 7–8 |
| Scratch Resistance Chrysler Test LP-463-PB-54-01 (Crock-mar Test 20° Gloss Retention) | 70–80% | 60–70% |
| Adhesion Chrysler Test 463PB-15-01 Dry Crosshatch Adhesion | 100% | 100% |
| Humidity Resistance ASTM D1735 (240 hours 100° F. 100% rel. humidity) | 100% Adhesion No Blisters; No Blush; No Cracking | 100% Adhesion No Blisters; No Blush; No Cracking |
| Durability (24 months Florida Exposure) Chrysler Test 463PB-34-01 | | |
| % 20° Gloss Retention | 78–85 | 80–88 |
| Blister/Blush | None/None | None/None |
| Acid Etch | Slight–Moderate | Slight–Moderate |
| Corrosion Resistance: ASTM D117 Salt Spray | | |
| 500 hours Salt Spray | | |
| Scribe Creep (mm) | 3–6 mm | 2–6 mm |
| Blister Size/Density | very small/very few | very small/very few |

CHEMKLEEN ™ 163 Cleaner is available from PPG Industries, Inc.
NUPAL ® 456 is available from PPG Industries, Inc.
Bonazinc ® 3001 is available from PPG Industries, Inc.
Envirocron ® Powder basecoat PZB53100 is available from PPG Industries, Inc.
Enviracryl ® powder clearcoat PCC10106 is available from PPG Industries, Inc.
ED6100H electrodeposition primer is available from PPG Industries, Inc.
HWB190430 Liquid-Waterborne basecoat is available from PPG Industries, Inc.
Diamond Coat ® DCT5002H is available from PPG Industries, Inc.

The above comparative examples show that the coating system of the present invention compares very favorably with the conventional coating system. The coating system of the present invention does not require an electrodeposition primer and provides greater flexibility than the conventional coating process, particularly with regards to efficiency and cost.

We claim:

1. A method of coating a substrate comprising (a) applying a conductive, weldable coating composition to the substrate;

(b) coalescing the conductive, weldable coating composition to form a substantially continuous conductive coating;

(c) applying a powder coating composition comprising a flake pigment to the conductive coating;

(d) heating the powder coating composition to a temperature and for a period of time sufficient to melt and level the powder coating composition to form a substantially continuous powder coating and sufficient to allow migration of the flake pigment to an interface between the powder coating and air, but not sufficient to cause the powder coating composition to crosslink; and (e) heating the substrate to a temperature and for a period of time sufficient to coalesce and crosslink the coating composition applied in step (c).

2. The method of coating of claim 1 wherein the substrate is metallic.

3. The method of coating of claim 2 wherein the substrate is coil sheet metal.

4. The method of coating of claim 3 wherein the substrate is non-ferrous.

5. The method of coating of claim 4 wherein the substrate is selected from the group consisting of aluminum, zinc, magnesium, and alloys and combinations thereof.

6. The method of coating of claim 2 wherein the substrate is ferrous metal.

7. The method of claim 6 in which the ferrous metal is selected from the group consisting of: electrogalvanized steel, hot dip galvanized steel, stainless steel, zinc iron alloys, zinc aluminum alloys, cold rolled steel, and combinations and mixtures thereof.

8. The method of coating of claim 7 in which the substrate is coil sheet metal.

9. The method of coating of claim 8 wherein the substrate coated with the conductive, weldable coating is (a) lubricated, wound into a coil for storage or transport, (b) stored or transported, (c) unwound into a sheet, (d) lubricated, (e) formed into a discrete shape, and (f) cleaned, (g) pretreated prior to applying the powder coating comprising a flake type pigment.

10. The method of claim 8 in which a coated substrate prepared by steps (a) and (b) are conducted at a steel mill or a coil coater and steps (c) through (e) are conducted at a different location.

11. The method of claim 10 in which the coated substrate is cleaned and pretreated and formed into discrete shapes.

12. The method of claim 10 in which the different location is an automotive assembly plant.

13. The method of claim 11 in which the discrete shapes are welded into a unit assembly.

14. The method of claim 11 in which the discrete shape are parts of an automobile.

15. The method of claim 13 in which the unit assembly is an automobile, truck or other motor vehicle.

16. The method of coating of claim 1 wherein the flake pigment is colored.

17. The method of coating of claim 16 wherein the flake pigment particle size is 1 to 50 microns.

18. The method of coating of claim 16 wherein the flake pigment is colored mica.

19. The method of coating of claim 16 wherein the flake pigment is colored aluminum.

20. The method of coating of claim 1 wherein the flake pigment is dry blended with the other components of the powder coating composition.

21. The method of coating of claim 1 wherein the flake pigment is present in the powder coating at a level ranging from 0.1% to 20% based on total weight of the powder coating composition.

22. The method of coating of claim 1 wherein the flake pigment is present in the powder coating at a level ranging from 1% to 15% based on the total weight of the powder coating composition.

23. The method of claim 1 wherein the powder coating composition of step (c) is thermosetting.

24. The method of claim 1 wherein the powder coating of step (c) is thermoplastic.

25. The method of claim 1 wherein the powder coating composition contains as a binder a polymer comprising epoxy functionality and a polyacid curing agent.

26. The method of claim 25 wherein the polymer comprising epoxy functionality is an acrylic polymer.

27. The method of claim 1 wherein the powder coating composition of step (c) contains as a binder a polymer comprising carboxylic acid groups and a hydroxyalkylamide curing agent.

28. The method of claim 27 wherein the polymer comprising carboxylic acid groups is a polyester.

29. A method of coating a ferrous metal substrate in sheet form comprising:

(a) applying a conductive, weldable coating composition to a coil metal substrate;

(b) coalescing and setting the conductive weldable coating composition to form a substantially continuous conductive, weldable coating;

(c) assembling the coated substrate of steps (a) and (b) into a metal coil and shipping the metal coil to an automotive assembly location;

(d) uncoiling, cleaning and pretreating the coated substrate of step (c) at the automotive assembly location;

(e) forming one or more automotive body part from the coated substrate of step (d);

(f) welding the automotive body part into an automotive body assembly;

(g) applying a crosslinkable color powder coating composition comprising a flake pigment selected from the groups consisting of colored mica and colored aluminum to the automotive body assembly;

(h) heating the color powder coating composition to a temperature and for period of time sufficient to melt and level the color powder coating composition to form a substantially continuous color powder coating and sufficient to allow migration of the flake pigment to an interface between the powder coating and air, but not sufficient to cause the powder coating composition to crosslink;

(i) applying a clear thermosetting powder clear coating composition to the automotive assembly obtained from step (h) heating the automotive assembly obtained from step (h) at a temperature and for a time sufficient to form a substantially clear powder coating and to crosslink both the color and the clear powder coating compositions.

* * * * *